United States Patent [19]

Winterfeldt

[11] Patent Number: 4,954,688

[45] Date of Patent: Sep. 4, 1990

[54] PLASMA ARC CUTTING TORCH HAVING EXTENDED LOWER NOZZLE MEMBER

[75] Inventor: Duane N. Winterfeldt, Clinton, Iowa

[73] Assignee: ESAB Welding Products, Inc., Florence County, S.C.

[21] Appl. No.: 429,989

[22] Filed: Nov. 1, 1989

[51] Int. Cl.⁵ .................................................. B23K 9/00
[52] U.S. Cl. ............................. 219/121.5; 219/121.48; 219/75; 219/121.51
[58] Field of Search ........... 219/121.48, 121.5, 121.51, 219/121.52, 74, 75; 313/231.31, 231.41; 315/111.21

[56] References Cited

U.S. PATENT DOCUMENTS

| | | | |
|---|---|---|---|
| 3,641,308 | 2/1972 | Couch, Jr. et al. | 219/121.5 |
| 3,825,718 | 7/1974 | Mosiashvili et al. | 219/121.5 |
| 4,311,897 | 1/1982 | Yerushalmy | 219/121.5 |
| 4,521,666 | 6/1985 | Severance, Jr., et al. | 219/75 |

*Primary Examiner*—M. H. Paschall
*Attorney, Agent, or Firm*—Bell, Seltzer, Park & Gibson

[57] ABSTRACT

A plasma arc cutting torch is disclosed which includes a nozzle assembly below the electrode for injection of water around the plasma flow so as to constrict the arc. The nozzle assembly includes upper and lower disc like nozzle members which are spaced apart to define a water gap therebetween, and the members include aligned bores for permitting the plasma to flow therethrough to the underlying workpiece. The lower nozzle member is of extended length, and its forward or lower end portion is beveled to define a frusto-conical exterior surface, so as to permit the torch to be positioned closely adjacent the workpiece when making beveled cuts and so as to achieve the predetermined standoff which maximizes the quality and speed of the cut.

11 Claims, 2 Drawing Sheets

PLASMA ARC CUTTING TORCH HAVING EXTENDED LOWER NOZZLE MEMBER

FIELD OF THE INVENTION

The present invention relates to a plasma arc cutting torch which is characterized by the ability to provide beveled cuts while maintaining a relatively short standoff distance from the workpiece.

BACKGROUND OF THE INVENTION

The U.S. Pat. to Hogan et al No. 3,619,549 discloses a water constricted plasma arc torch for metal cutting, and wherein a swirling flow of water is formed which impinges upon the plasma arc and which serves to constrict the arc and thus improve cutting quality and speed. The U.S. Pat. to Couch et al 3,641,308 discloses a similar torch and wherein the water is formed about the arc by an annular nozzle assembly. The nozzle assembly comprises a pair of upper and lower disc like nozzle members which are positioned below the electrode. The plasma gas and arc pass thorough aligned bores in the two nozzle members, and the water is introduced radially toward the plasma gas and arc through a gap which is formed between the two nozzle members.

The U.S. Pat. to Yerushalmy, No. 4,311,897 represents a further refinement of the above basic torch design. More particularly, Yerushalmy teaches that a predetermined dimensional relationship must be maintained between the length of the bores and the water gap defined between the two nozzle members, in order to minimize the sensitivity of the torch to variations in torch "standoff" from the workpiece. The term "standoff" as used herein refers to the particular distance between the end of the bore in the lower nozzle member and the workpiece, and which is determined empirically to maximize the cut quality and speed. As a specific example, the predetermined standoff for cutting at 400 amperes with a model PT-15 torch as presently sold by L-Tec Welding and Cutting 0 Systems of Florence, S.C, is usually 0.375 inches plus or minus 0.06 inch. The Yerushalmy patent teaches that the length of the bore in the lower nozzle member is the most significant factor in controlling standoff sensitivity, and that the optimum range for the length of the lower bore is a fraction of the length of the bore in the upper nozzle member and should lie between 0.07 and 0.16 inches for a torch of the described type. This teaching has been followed by those skilled in the art, and the bores of the upper and lower nozzle members in commercial torches have been designed within the indicated parameters. Also, it has been desirable and commercial practice to fabricate the lower nozzle member from a ceramic insulator material, and it was believed that arc starting would be difficult if not impossible if the length of the lower bore were longer than taught by the Yerushalmy patent.

When making beveled cuts at for example 45°, the torch must be inclined with respect to the workpiece and it is impossible to maintain a standoff of less than about 0.62 inches utilizing the above described PT-15 torch, since the body of the torch will contact the workpiece. This very long standoff is significantly beyond the empirically determined most satisfactory distance, and it results in wider kerf widths, rounded cut surfaces, and burn back on the top edge of the workpiece.

It is accordingly an object of the present invention to provide a plasma arc cutting torch of the described type wherein the most effective standoff can be maintained even when the torch is inclined with respect to the workpiece so as to produce a beveled cut.

It is also an object of the present invention to provide a plasma arc torch which is capable of producing beveled cuts of improved quality and speed, and which has acceptable starting characteristics.

SUMMARY OF THE INVENTION

The above and other objects and advantages of the present invention are achieved by the surprising discovery that the bore through the lower nozzle member may be substantially longer in length than is indicated from the teachings of the Yerushalmy patent, and that by making the bore of the lower nozzle member longer, the standoff may be reduced to the empirically determined most satisfactory distance when making beveled cuts at for example 45°. This reduced standoff significantly improves the quality of the beveled cut. Further, it has been found that the increased length of the bore of the lower nozzle member does not render starting of the torch more difficult as was heretofore predicted.

In accordance with the present invention a plasma arc torch is provided which comprises an electrode defining a discharge end and a longitudinal axis, an upper nozzle member mounted adjacent the discharge end of the electrode and having a first bore therethrough of predetermined length $L_1$ and which is aligned with the longitudinal axis, and a lower nozzle member mounted adjacent the upper nozzle member on the side thereof opposite the electrode and having a second bore therethrough of predetermined length $L_2$ which is aligned with the longitudinal axis. Also, the torch includes means for creating an electrical arc extending from the discharge end of the electrode through the first and second bores and to a workpiece located adjacent the side of the lower nozzle member opposite the upper nozzle member, vortex generating means for generating a vortical flow of a gas between the electrode and the upper nozzle member and so as to create a plasma flow outwardly through the first and second bores and to the workpiece, and means for introducing a jet of liquid between the upper and lower nozzle members and so as to envelope the plasma as it passes through the second bore. Finally, in the torch of the present invention, the length $L_2$ of the bore in the lower nozzle member is at least as great as length $L_1$ of the bore in the upper nozzle member. In the preferred embodiment, the upper and lower nozzle members are separated a predetermined distance $W_g$, and the length $L_2$ is at least as great as the length $L_1$ plus the distance $W_g$.

Further, the lower nozzle member preferably comprises a cylindrical body portion defining a forward end portion and a rearward end portion, and with the second bore extending coaxially therethrough and defining a bore diameter $D_2$. An annular mounting flange is positioned on the rearward end portion of said body portion, and a frusto-conical surface is formed on the exterior of the forward end portion so as to be coaxial with the second bore. The frusto-conical surface has a cone angle of between about 60° and 120°, an axial height $H$, and a radial dimension $R$. Also, $H$ is equal to at least about one half $L_2$, $L_2$ is between about, 0.16 to 0.60 inches, $D_2$ is between 0.140 to 0.260 inches, and $L_2$ is equal to about 0.65 minus 7.8 ($D_2$):

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
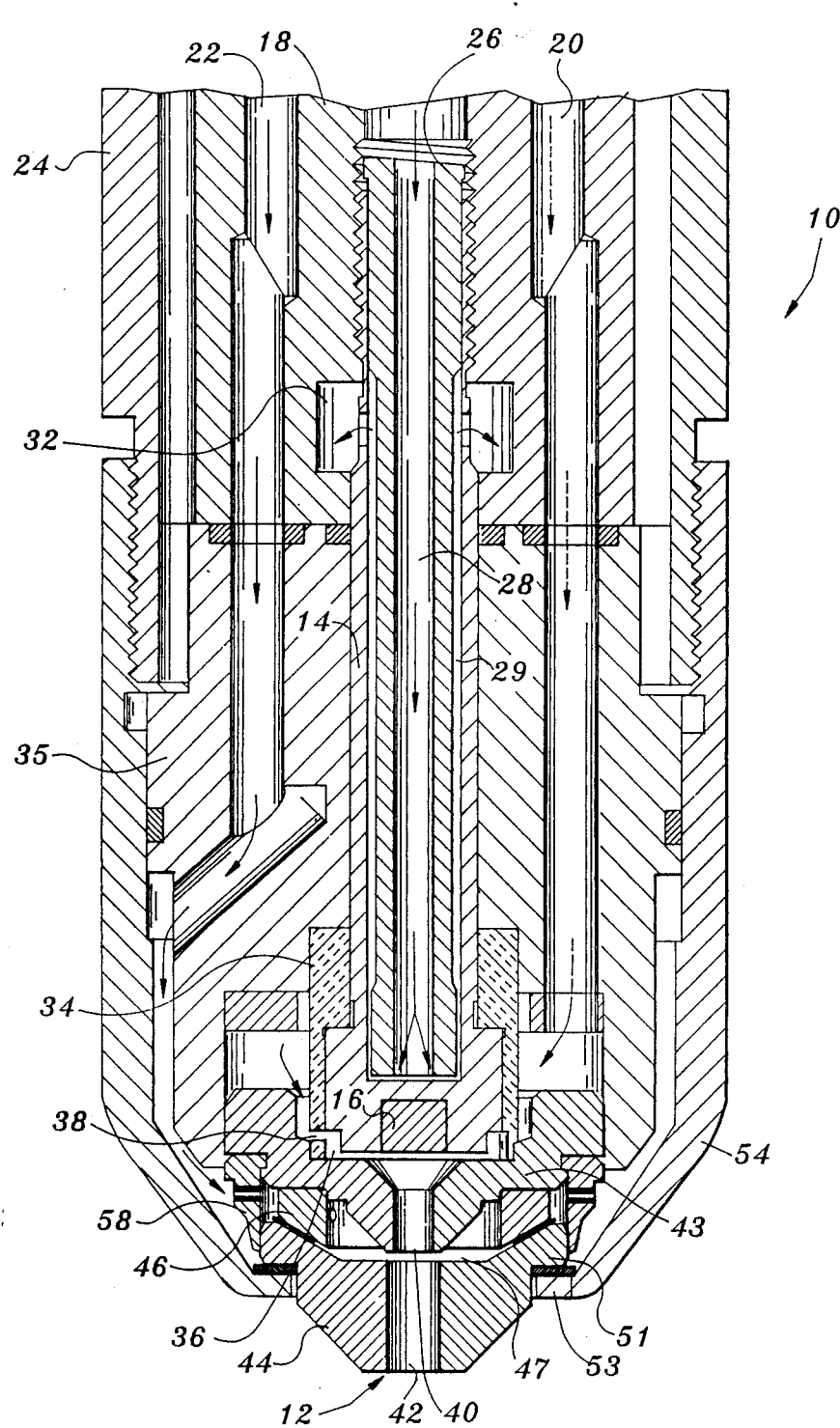
FIG. 1 is a sectioned side elevation view of a plasma arc torch which embodies the features of the present invention.
Figure 2:
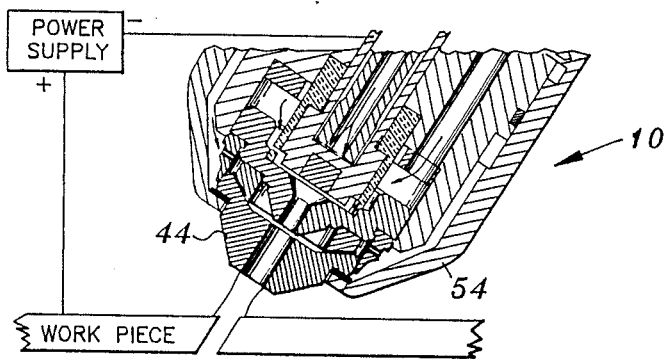
FIG. 2 is a fragmentary sectional view of the lower portion of the torch and shown positioned to form a beveled cut in a workpiece.
Figure 3:
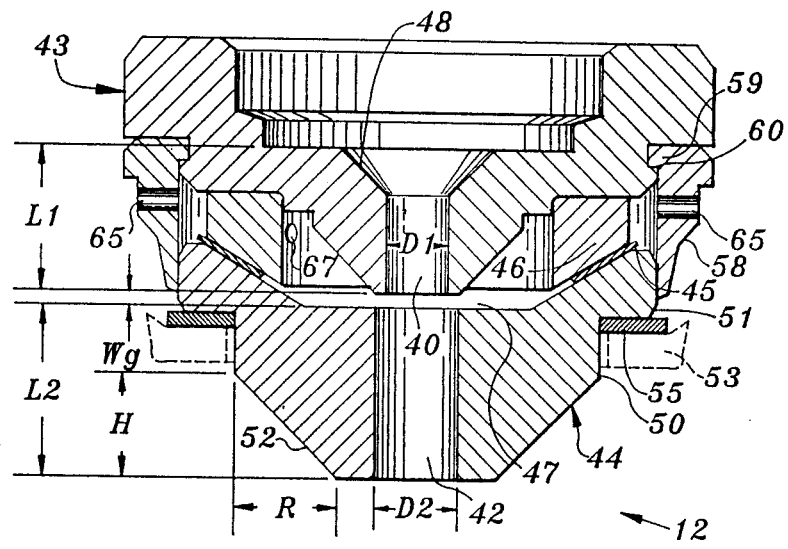
FIG. 3 is a somewhat enlarged fragmentary sectioned view of the nozzle assembly of the torch.

Referring initially to the embodiment of FIGS. 1-3, a plasma arc torch 10 is illustrated which includes a nozzle assembly 12. The torch 10 also includes a nonconsumable tubular electrode structure 14 which is preferably made of copper and having a tungsten or thoriated tungsten insert 16 mounted in the lower end and which serves as the cathode terminal. The electrode structure 14 thus defines a lower or discharge end at the insert 16, and a longitudinal axis which is vertical as illustrated in FIG. 1. Also the electrode structure 14 is mounted in a torch body 18 which has gas and liquid passageways 20 and 22 respectively. The torch body 18 is surrounded by an outer insulated housing member 24.

A tube 26 is suspended within the central bore 28 of the electrode structure 14 for circulating a liquid medium such as water through the electrode structure 14. The tube 26 is of a diameter smaller than the diameter of the bore 28 so as to provide a space 29 for the water to flow upon discharge from the tube 26. The water flows from a source (not shown) through the tube 26 and back through the space 29 to the opening 32 in the torch body 18 and to a drain hose (not shown). The passageway 22 directs the injection water into the nozzle assembly 12 where it is converted into a swirling vortex for surrounding the plasma arc as will be explained in more detail below. The gas passageway 20 directs gas from a suitable source (not shown), through a conventional gas baffle 34 of any suitable high temperature ceramic material into a gas plenum chamber 36 via inlet holes 38. The inlet holes 38 are arranged so as to cause the gas to enter the plenum chamber 36 in a swirling fashion as is well-known. The gas flows out from the plenum chamber 36 through the arc constricting bores coaxial 40 and 42 of the nozzle assembly 12. The electrode structure 14 upon being connected to the torch body 18 holds in place the ceramic gas baffle 34 and a high temperature plastic insulating member 35. The member 35 electrically insulates the nozzle assembly 12 from the electrode structure 14.

The nozzle assembly 12 comprises an upper nozzle member 43 and a lower nozzle member 44, with the members 43 and 44 including the first and second bores 40, 42 respectively. Although the upper and lower nozzle members may be metal, a ceramic material such as alumina is preferred for the lower nozzle member.

The lower nozzle member 44 is separated from the upper nozzle member 43 by a plastic spacer element 45 (FIG. 3) and a water swirl ring 46. The space provided between the upper nozzle member 43 and the lower nozzle member 44 forms a water chamber 47. The bore 40 of the upper nozzle member 43 is in axial alignment with the longitudinal axis of the torch electrode structure 14. Also, the bore 40 is cylindrical, it has a diameter D1, and it has a chamfered upper end 48 adjacent the plenum chamber 36, with a chamfer angle of about 45°.

In the illustrated embodiment, the lower nozzle member 44 comprises a cylindrical body portion 50 which defines a forward (or lower) end portion and a rearward (or upper) end portion, and with the bore 42 extending coaxially through the body portion. An annular mounting flange 51 is positioned on the rearward end portion, and a frusto-conical surface 52 is formed on the exterior of the forward end portion so as to be coaxial with the second bore 42. Also, the frusto-conical surface 52 has a cone angle at its vertex of about 90°. The annular flange 51 is supported from below by an inwardly directed flange 53 at the lower end of the cup 54, with the cup 54 being detachably mounted by interconnecting threads to the outer housing member 24. Also, a gasket 55 is disposed between the two flanges 51 and 53.

The arc constricting bore 42 in the lower nozzle member 44 is cylindrical, and it is maintained in axial alignment with the arc constricting bore 40 in the upper member 43 by a centering sleeve 58 of any suitable plastic material. The centering sleeve 58 has a lip 59 at the upper end thereof which is detachably locked into an annular notch 60 in the upper nozzle member 43. The centering sleeve 58 extends from the upper nozzle in biased engagement against the lower member 44. The swirl ring 46 and spacer element 45 are assembled prior to insertion of the lower member 44 into the sleeve 58. The water flows from the passageway 22 through openings 65 in the sleeve 58 to the injection ports 67 of the swirl ring 46, and which inject the water into the water chamber 47. The injection ports 67 are tangentially disposed around the swirl ring 46, to cause the water to form a vortical pattern in the water chamber 47. The water exits the water chamber 47 through the arc constricting bore 42 in the lower nozzle member 44.

A power supply (FIG. 2) is connected to the torch electrode structure 14 in a series circuit relationship with a metal workpiece which is typically grounded. In operation, the plasma arc is established between the cathode terminal 16 of the torch 10 and the workpiece, which is positioned below the lower nozzle member 44. The plasma arc is started in a conventional manner by momentarily establishing a pilot arc between the electrode structure 14 and the nozzle assembly 12 which is then transferred to the workpiece through the arc constricting bores 40 and 42 respectively. Each arc constricting bore 40 and 42 contributes to the intensification and collimation of the arc, and the swirling vortex of water envelopes the plasma as it passes through the lower passageway 42.

In accordance with the present invention, the bore 42 of the lower nozzle member 44 has a longitudinal length L2 (FIG. 3) substantially greater than the length L1 of the bore 40 of the upper nozzle member 43. Thus the lower nozzle member extends a substantial distance below the annular supporting flange 53 at the lower end of the cup 54. Preferably, the length L2 is at least as great as the length L1 plus the distance Wg, which represents the length of the water gap separating the upper and lower bores. Also, it is preferred that the diameter D2 of the lower bore 42 be somewhat greater than the diameter D1 of the upper bore 40.

It is also preferred that the frusto-conical surface 52 have a cone angle at its vertex of between about 60° to 120°, an axial height H, and a radial dimension R, and wherein H is equal to at least about one half L2. Also, the radial dimension R of the frusto-conical surface 52 is at least about equal to the bore diameter D2. In the embodiment of FIGS. 1-3, the cone angle at the vertex of the frusto-conical surface 52 is 90°, and thus H equals R.

FIG. 2 illustrates the torch of the present invention in an operative tilted position for forming a beveled cut in a workpiece. As will be apparent, the fact that the lower nozzle member 44 extends well below the supporting flange 53 at the lower end of the cup 54, and the fact that the member 44 has a beveled i.e. frusto-conical surface 52, permit the standoff to be a relatively short distance which conforms to the predetermined most satisfactory distance for maximizing cut quality and speed.

As a preferred, non-limiting example, a torch embodying the features of the present invention may be constructed and operated within the following parameters:

| | |
|---|---|
| Power | 400 amperes |
| Water Rate | 0.38 gpm |
| Gas Flow Rate | 140 cfh |
| L1 | .16 to .40 inches |
| L2 | .16 to .60 inches |
| Wg | .01 to .10 inches |
| D1 | .125 to .230 inches |
| D2 | .140 to .260 inches |

An empirical formula has also been determined which relates the bore diameter D2 of the lower nozzle member to the bore length L2 of the lower nozzle member for the above and similar torches, and in accordance with the present invention, as follows: $L2 = 0.65$ minus $7.8(D2)^2$.

Figure 4:
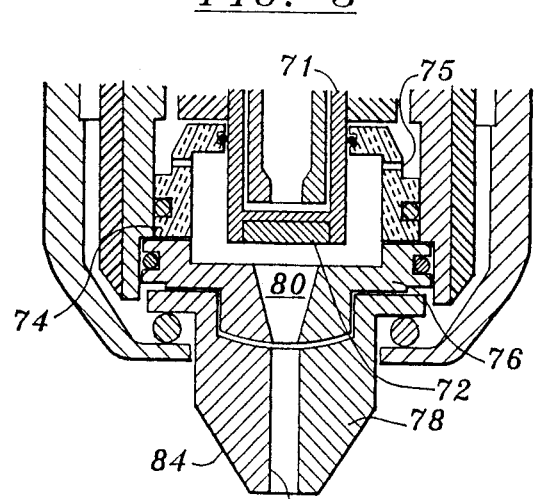
FIG. 4 is a sectioned side elevation view of the lower portion of a second embodiment of a torch in accordance with the present invention.

FIG. 4 illustrates a second embodiment of a torch which embodies the features of the present invention. This torch includes an electrode structure 71 which mounts an insert 72 at its lower end. A baffle 74 surrounds the lower portion of the electrode structure, and the baffle includes openings 75 which are arranged to admit the air in a swirling fashion. The nozzle assembly includes an upper nozzle member 76 and a lower nozzle member 78 which are separated to form a water gap therebetween. The upper nozzle member 76 has a bore 80 having the cross section of an inverted cone, and the lower nozzle member 78 includes an elongate cylindrical bore 82 which has a length substantially greater than the length of the bore 80 and the water gap. Also, the lower portion of the periphery of the lower nozzle member 78 includes a frusto-conical surface 84 which further facilitates the reduction of the standoff when making beveled cuts as illustrated in FIG. 2.

In the drawings and specification, there has been set forth a preferred embodiment of the invention, and although specific terms are employed, they are used in a generic and descriptive sense only and not for purposes of limitation.

That which is claimed is:

1. A plasma arc torch which is characterized by the ability to provide beveled cuts while maintaining a relatively short standoff distance from a workpiece, and comprising an electrode defining a discharge end and a longitudinal axis, an upper nozzle member mounted adjacent said discharge end of said electrode and having a first bore therethrough of predetermined length L1 and which is aligned with said longitudinal axis, a lower nozzle member mounted adjacent said upper nozzle member on the side thereof opposite said electrode and having a second bore therethrough of predetermined length L2 which is aligned with said longitudinal axis, said lower nozzle member comprising a cylindrical body portion defining a forward end portion and a rearward end portion and having said second bore extending coaxially therethrough and defining a bore diameter D2, an annular mounting flange positioned on said rearward end portion of said body portion, a frusto-conical surface formed on the exterior of said forward end portion so as to be coaxial with said second bore and having a cone angle of between about 60° and 120°, an axial height H, and a radial dimension R, means for creating an electrical arc extending from said discharge end of said electrode through said first and second bores and to a workpiece located adjacent the side of said lower nozzle member opposite said upper nozzle member, means for generating a vortical flow of a gas between said electrode and said upper nozzle member and so as to create a plasma flow outwardly through said first and second bores and to said workpiece, means for introducing a jet of liquid between said upper and lower nozzle members and so as to envelope said plasma as it passes through said second bore, and wherein length L2 is at least as great as length L1, H is equal to at least about one half L2, L2 is between about 0.16 to 0.60 inches, and D2 is between 0.125 to 0.260 inches.

2. The plasma torch as defined in claim 1 wherein said upper and lower nozzle members are separated a predetermined distance Wg, and wherein the length L2 is at least as great as length L1 plus distance Wg.

3. The plasma arc torch as defined in claim 1 wherein L1 is between about 0.16 to 0.40 inches, and Wg is between about 0.01 to 0.10 inches.

4. The plasma torch as defined in claim 1 wherein the diameter of said second bore is greater than the diameter of said first bore.

5. The plasma arc torch as defined in claim 1, wherein L2 is equal to about $0.65$ minus $7.8(D2)^2$, and the radial dimension R of said frusto-conical surface is at least about equal to said bore diameter D2.

6. A nozzle assembly adapted for use in a plasma arc torch of the type which includes a nozzle assembly aligned below an electrode and such that the arc passes from the electrode through the nozzle assembly to the workpiece, said nozzle assembly imparting the ability to the torch to achieve beveled cuts while maintaining a relatively short standoff distance from a workpiece and comprising an upper nozzle member adapted to be mounted adjacent said electrode and having a first bore therethrough of predetermined length L1, and a lower nozzle member adapted to be mounted adjacent said upper nozzle member on the side thereof opposite said electrode, said lower nozzle member comprising (a) a cylindrical body portion defining a forward end portion and a rearward end portion and having a second bore extending coaxially therethrough and defining a bore length L2 and a bore diameter D2,
(b) an annular mounting flange positioned on said rearward end portion of said body portion,
(c) a frusto-conical surface formed on the exterior of said forward end portion so as to be coaxial with said second bore and having a cone angle of between about 60° and 120°, an axial height H, and a radial dimension R, and
wherein length L2 is at least as great as length L1, H is equal to at least about one half L2, L2 is between about 0.16 to 0.60 inches, and D2 is between 0.140 to 0.260 inches.

7. The nozzle assembly as defined in claim 6 wherein L2 is equal to about 0.65 minus 7.8 $(D2)^2$, and the diameter of said second bore is greater than the diameter of said first bore.

8. The nozzle assembly as defined in claim 6 wherein said radial dimension R of said frusto-conical surface is at least about equal to said second bore diameter D2.

9. An extended lower nozzle member adapted for use in a plasma arc torch of the type which includes upper and lower nozzle members aligned below the electrode, and such that the arc passes from the electrode through the upper and lower nozzle members to the workpiece, and with said lower nozzle member being configured to impart the ability to the torch to achieve beveled cuts while maintaining a relatively short standoff distance from a workpiece, said lower nozzle member comprising a cylindrical body portion defining a forward end portion and a rearward end portion and having a bore extending coaxially therethrough and defining a bore length L2 and a bore diameter D2, an annular mounting flange positioned on said rearward end portion of said body portion, a frusto-conical surface formed on the exterior of said forward end portion so as to be coaxial with said bore and having a cone angle of between about 60° and 120°, an axial height H, and a radial dimension R, and wherein H is equal to at least about one half L2, L2 is between about 0.16 to 0.60 inches, D2 is between about 0.140 to 0.260 inches.

10. The lower nozzle member as defined in claim 9 wherein L2 is equal to about 0.65 minus $7.8(D2)^2$, and the radial dimension R of said frusto-conical surface is at least about equal to said bore diameter D2.

11. The lower nozzle member as defined in claim 10 wherein said member is composed of a ceramic material.

* * * * *